United States Patent [19]

Ikegaya

[11] Patent Number: 5,260,991
[45] Date of Patent: Nov. 9, 1993

[54] FACSIMILE APPARATUS

[75] Inventor: Tadahiko Ikegaya, Saitama, Japan

[73] Assignee: Fuji Xerox Co., Ltd., Tokyo, Japan

[21] Appl. No.: 808,926

[22] Filed: Dec. 18, 1991

[30] Foreign Application Priority Data

Mar. 11, 1991 [JP] Japan ............................. 3-69365
Sep. 10, 1991 [JP] Japan ............................ 3-257206

[51] Int. Cl.⁵ ........................ H04M 11/00; H04J 3/12
[52] U.S. Cl. .................................. 379/100; 379/94;
 358/442; 358/468; 370/110.1
[58] Field of Search .................. 379/100, 93, 94, 102,
 379/104, 105; 358/400, 434, 442, 407, 436, 438,
 468; 370/58.1, 110.1

[56] References Cited

U.S. PATENT DOCUMENTS 4,935,923 6/1990 Shimizu et al. ................ 370/110.1
4,939,772 7/1990 Goto ................................... 379/100
4,961,185 10/1990 Sawada ............................ 379/100
4,975,900 12/1990 Murata et al. ................... 370/58.1

Primary Examiner—Jin F. Ng
Assistant Examiner—Jason Chan
Attorney, Agent, or Firm—Finnegan, Henderson, Farabow, Garrett & Dunner

[57] ABSTRACT

A facsimile apparatus having an automatic facsimile/telephone switching function, comprises detecting unit for detecting a high layer compatibility included in a setup message of an ISDN and control unit for immediately connecting the facsimile apparatus to a distant station when the high layer compatibility is indicating a facsimile apparatus. Thereby, in the case where the high layer compatibility is FAX, the FAX is immediately connected to the telephone line. Hence, the waste of time and wasteful bell sound can be eliminated.

3 Claims, 6 Drawing Sheets

FACSIMILE APPARATUS

BACKGROUND OF THE INVENTION

The present invention relates to a facsimile apparatus, and more particularly to a facsimile apparatus having an automatic facsimile/telephone switching function.

Conventionally, a facsimile apparatus is known which, to allow a telephone line to be used as both a facsimile apparatus (hereinafter referred to as the FAX) and a telephone, is provided with an automatic FAX/TEL switching function. The automatic FAX/TEL switching function realizes the following operation.

As shown in FIG. 4, in a normal state, a telephone 24 is connected to a telephone line 21 via a switching device 23. If it is now assumed that a call is received via the telephone line 21 at a timing t0 shown in FIG. 5, a timer 22 starts counting. If the telephone is hooked off within a predetermined time (between timings t0-t1 in FIG. 5), the received call is connected to the telephone 24. However, unless the telephone is hooked off within the predetermined time, the switching device 23 is switched over to the FAX 25 side by a time-up signal from the timer 22. If the telephone line 21 is connected to the FAX 25, the FAX 25 starts communication with a distant apparatus in accordance with a predetermined protocol.

The above-described automatic FAX/TEL switching function is provided on G2/G3 FAX which are presently connected to a public telephone network.

In recent years, active use has been made of ISDN networks, and it is conceivable that the above-described automatic FAX/TEL switching function will also come to be provided on the G2/G3 FAX which are connected the ISDN networks. As is known, there are cases where the D-channel protocol of the ISDN includes high layer compatibility (HLC) for designating a type of terminal of communication. In the case where the high layer compatibility HLC includes an attribute for setting the party at the other end of the line to be a telephone or setting the same to be G2/G3 FAX.

However, if the G2/G3 FAX connected to an ISDN network is provided with the above-described automatic FAX/TEL switching function, there has been a drawback in that since the automatic FAX/TEL switching function operates regardless of whether or not the aforementioned high layer compatibility HLC is present, if the G2/G3 FAX is designated by the high layer compatibility HLC, time is wasted until that FAX is connected. Specifically, there has been the problem that the time duration of t0-t1 mentioned above is wasted.

In addition, there is a problem in that if a changeover is effected from the telephone 24 to the G2/G3 FAX 25 by the switching device 23 at the timing t1, when the distant apparatus is telephone, the connection therewith may end unsuccessfully.

SUMMARY OF THE INVENTION

An object of the present invention is to overcome the above-described drawbacks of the conventional apparatus and to provide a facsimile apparatus in which, if G2/G3 FAX is designated by the high layer compatibility HLC, the waste of time and the wasteful sound of a bell until a connection thereto is established will not occur.

Another object of the present invention is to substantially improve a success rate of connection between a called party and a facsimile apparatus if it is determined that there is no high layer compatibility HLC.

To attain the above-described objects, according to the first aspect of the invention, a facsimile apparatus having an automatic facsimile/telephone switching function comprises means for detecting a high layer compatibility included in a setup message of an ISDN and means for immediately connecting the facsimile apparatus to a distant station when the high layer compatibility is indicating a facsimile apparatus.

According to the second aspect of the invention, a facsimile apparatus having an automatic facsimile/telephone switching function comprises means for detecting a high layer compatibility included in a setup message of an ISDN and means for preferentially connecting the facsimile apparatus to a distant station when there is no high layer compatibility.

According to the invention, when the high layer compatibility included in a setup message of an ISDN is a facsimile apparatus, the facsimile apparatus is immediately connected to the ISDN. For this reason, since it does not take time until a connection to the facsimile apparatus is established, it is possible to eliminate the waste of time due to a delayed response.

In addition, where there is no high layer compatibility, since communication is first commenced by the protocol of facsimile, it is possible to accurately determine whether or not the distant apparatus is a facsimile apparatus, so that it is possible to reduce the number of erroneous operations, and a success rate of connection between a called party and facsimile apparatus can be improved substantially.

DESCRIPTION OF PREFERRED EMBODIMENTS

Figure 1:
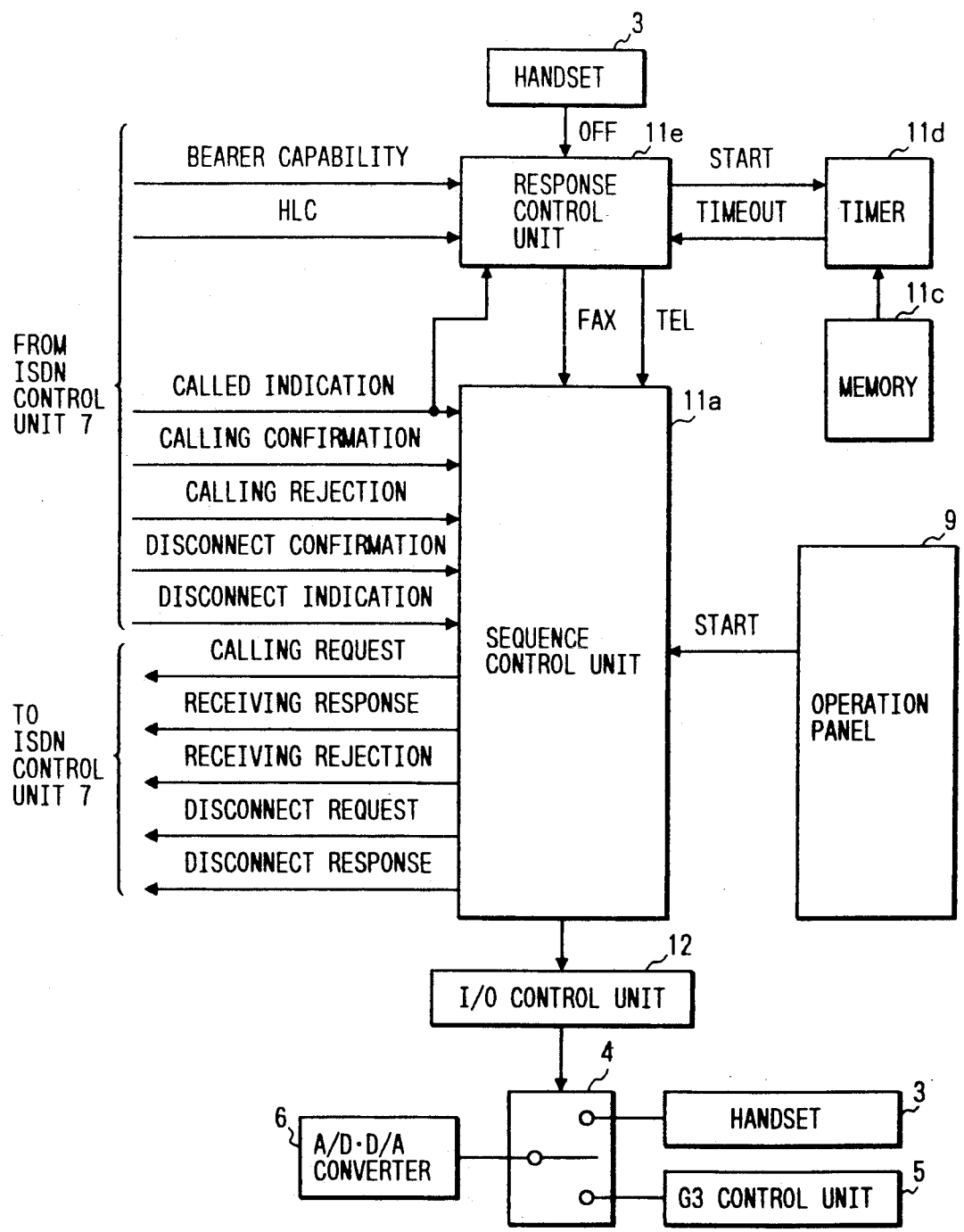
FIG. 1 is a functional block diagram of an embodiment of the present invention.

Referring now to the drawings, a detailed description will be given of the present invention.

Figure 2:
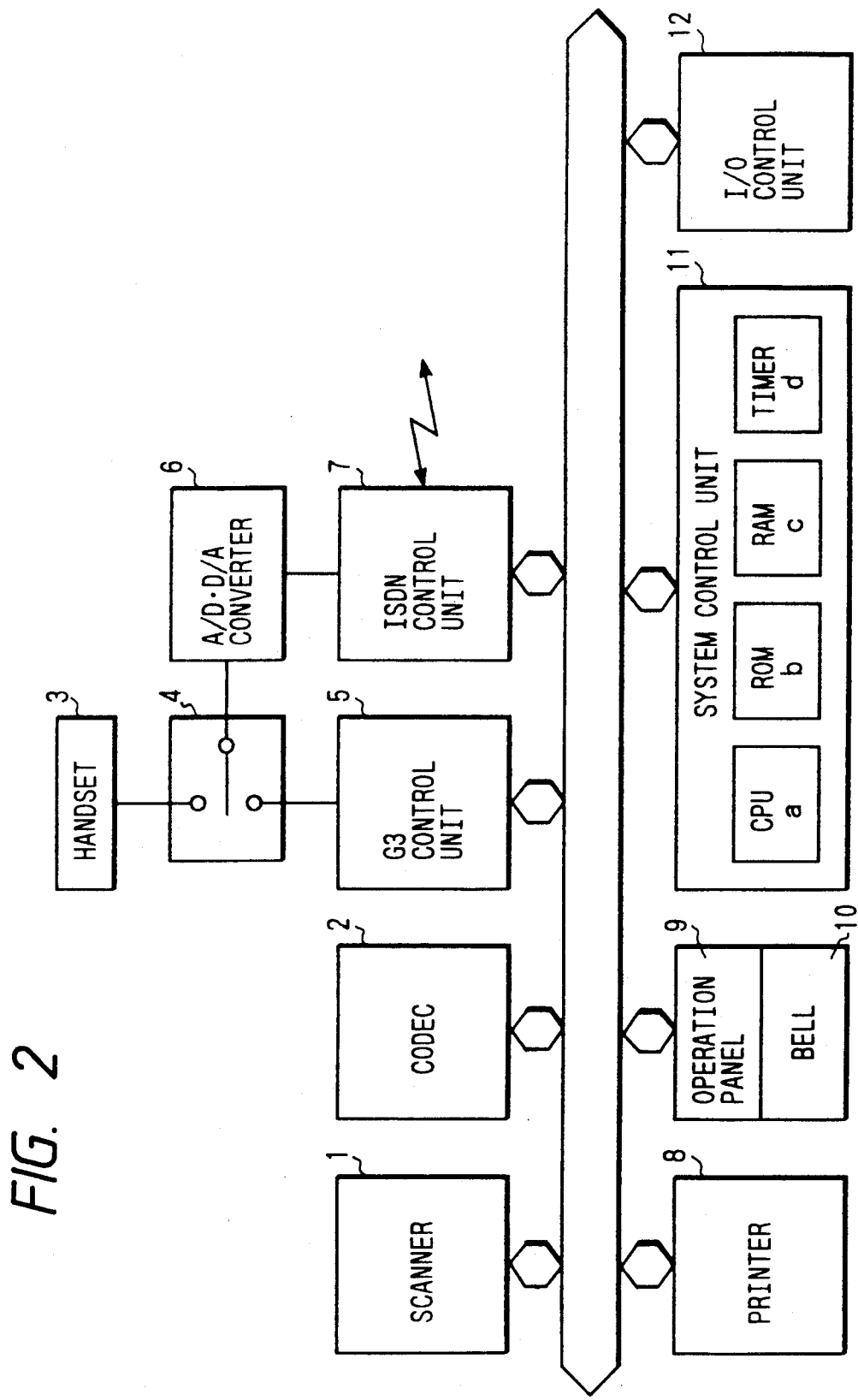
FIG. 2 is a block diagram illustrating a hardware configuration of a facsimile apparatus in accordance with the embodiment of the present invention.

FIG. 2 is a block diagram illustrating a hardware configuration to a facsimile apparatus to which the present invention is applied. In the drawing, reference numeral 1 denotes a scanner for reading document information and converting the same to image information of electoral signals; numeral 2, a codec for coding the image information by a coding method having a good compression rate or decoding the image information coded; 3, a telephone (handset) used by being switched over between the same and FAX; and 4, a changeover switch. In addition, reference numeral 5 denotes a G3 control unit for controlling communication with a distant apparatus by outputting the protocol signal of a G3 facsimile apparatus; numeral 6, an analog/digital (A/D), digital/analog (D/A) converter; and 7, an ISDN control unit for establishing a matching of communication with an ISDN network.

In addition, reference numeral 8 denotes a printer for printing out the received image information onto paper; 9, an operation panel having a numeric keypad, function keys, a display, etc.; and 10, a bell adapted to ring at the time of the reception of a call. Reference numeral 11 denotes a system control unit for controlling the overall facsimile operation. The system control unit 11 includes a CPU 11a, a ROM 11b, a RAM 11c, and a timer 11d. Reference numeral 12 denotes an I/O control unit, and the operation of the changeover switch 4 is controlled by an output signal thereof.

Referring now to FIG. 1, a description will be given of a functional block diagram of an embodiment of the present invention. In the drawing, identical or equivalent units to those shown in FIG. 2 are denoted by the same reference numerals.

Upon receiving "SETUP," an ISDN control unit 7 transmits "CALL PROCEEDING" to the ISDN network, and in a case where its information bearer capability is a 3.1 kHz audio signal or voice, the ISDN control unit 7 notifies the reception of a call (called indication) to the system control unit 11 and indicates its high layer compatibility HLC and its bearer capability.

As shown in FIG. 1, the called indication is imparted to a response control unit 11e and a sequence control unit 11f which correspond to the function of the CPU 11a of the system control unit 11, In addition, the high layer compatibility HLC and the bearer capability are transmitted to the response control unit 11e. The response control unit 11e analyzes the high layer compatibility HLC, if present, and the bearer capability on the basis of the information received. In response to the result of this analysis, the following three operations are effected in this embodiment.

(1) Case where there is no high layer compatibility HLC and the bearer capability is 3.1 kHz audio signal.

In this case, the response control unit 11e starts the timer 11d. As automatic FAX/TEL switching time has been set in advance in the timer 11d from the memory 11c. If the handset 3 is hooked off before a time-out is reached after the starting of the timer 11d, the response control unit 11e notifies a telephone (TEL) response to the sequence control unit 11a. Upon receiving the telephone response, the sequence control unit 11a immediately changes over the switch 4 to the handset 3 side via the I/O control unit 12, thereby connecting the A/D-D/A converter 6 to the handset 3. As a result of this connection, a telephone conversation using the telephone becomes possible.

Unless the handset 3 is hooked off before the time-out of the timer 11d is reached, the response control unit 11e notifies a FAX response to the sequence control unit 11a. Upon receiving the FAX response, the sequence control unit 11a changes over the switch 4 to the G3 control unit 5 side via the I/O control unit 12, thereby connecting the A/D-D/A converter 6 to the FAX. As a result of this connection, communication using the FAX becomes possible.

(2) Case where the high layer compatibility HLC is telephone (TEL).

Without starting the timer 11d, the response control unit 11e notifies a telephone response to the sequence control unit 11f. Upon receiving the telephone response, the sequence control unit 11a changes over the switch 4 to the handset 3 side via the I/O control unit 12, thereby connecting the A/D-D/A converter 6 to the handset 3. As a result of this connection, a telephone conversation using the telephone becomes possible.

(3) Case where the high layer compatibility HLC is G2/G3 FAX.

Without starting the timer 11d, the response control unit 11e notifies a FAX response to the sequence control unit 11a. Upon receiving the FAX response, the sequence control unit 11a changes over the switch 4 to the G3 control unit 5 side via the I/O control unit 12, thereby connecting the A/D-D/A converter 6 to the FAX. As a result of this connection, communication using the FAX becomes possible.

Figure 3:
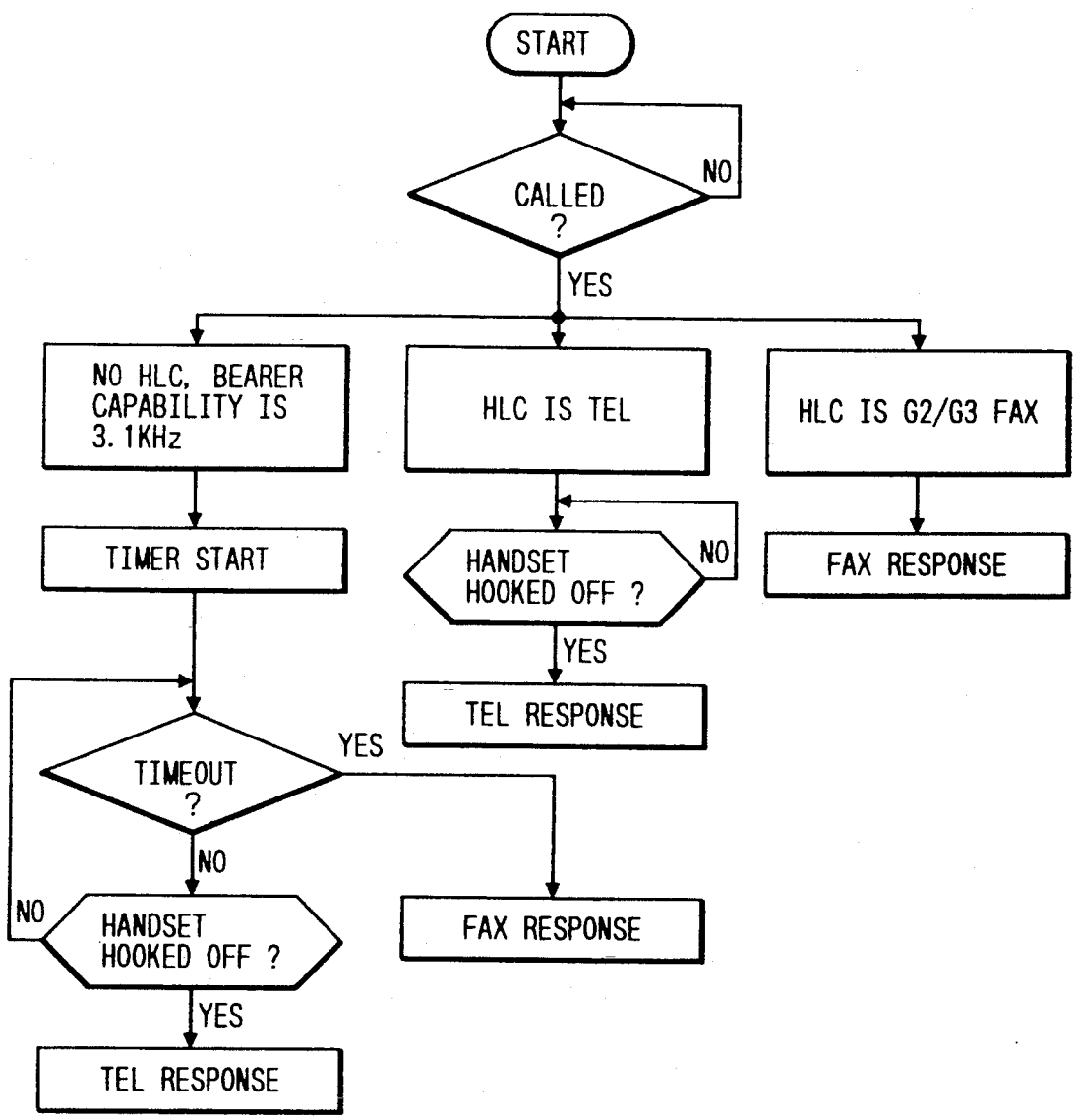
FIG. 3 is a flowchart illustrating the operation of the embodiment.
Figure 4:
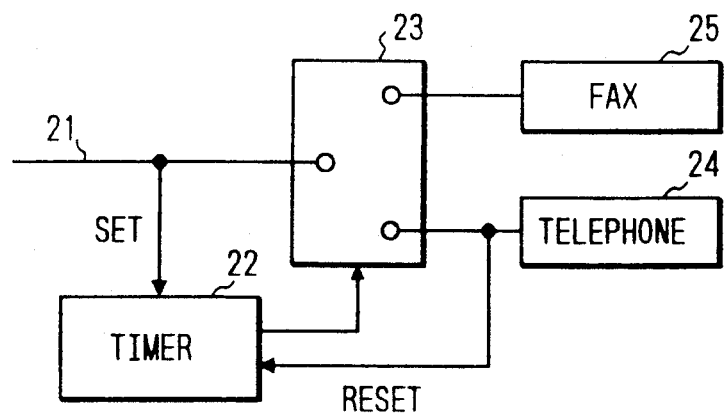
FIG. 4 is a functional block diagram illustrating an automatic facsimile/telephone switching function.
Figure 5:
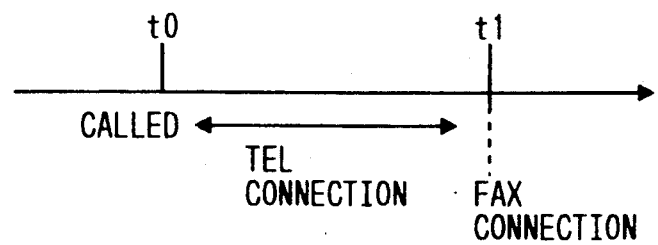
FIG. 5 is a timing chart illustrating the automatic facsimile/telephone switching function.

The above-described operations, if expressed by a flowchart, are shown in FIG. 3. Since the meaning of this flowchart is apparent from the foregoing description, a description thereof will be omitted.

Figure 6:
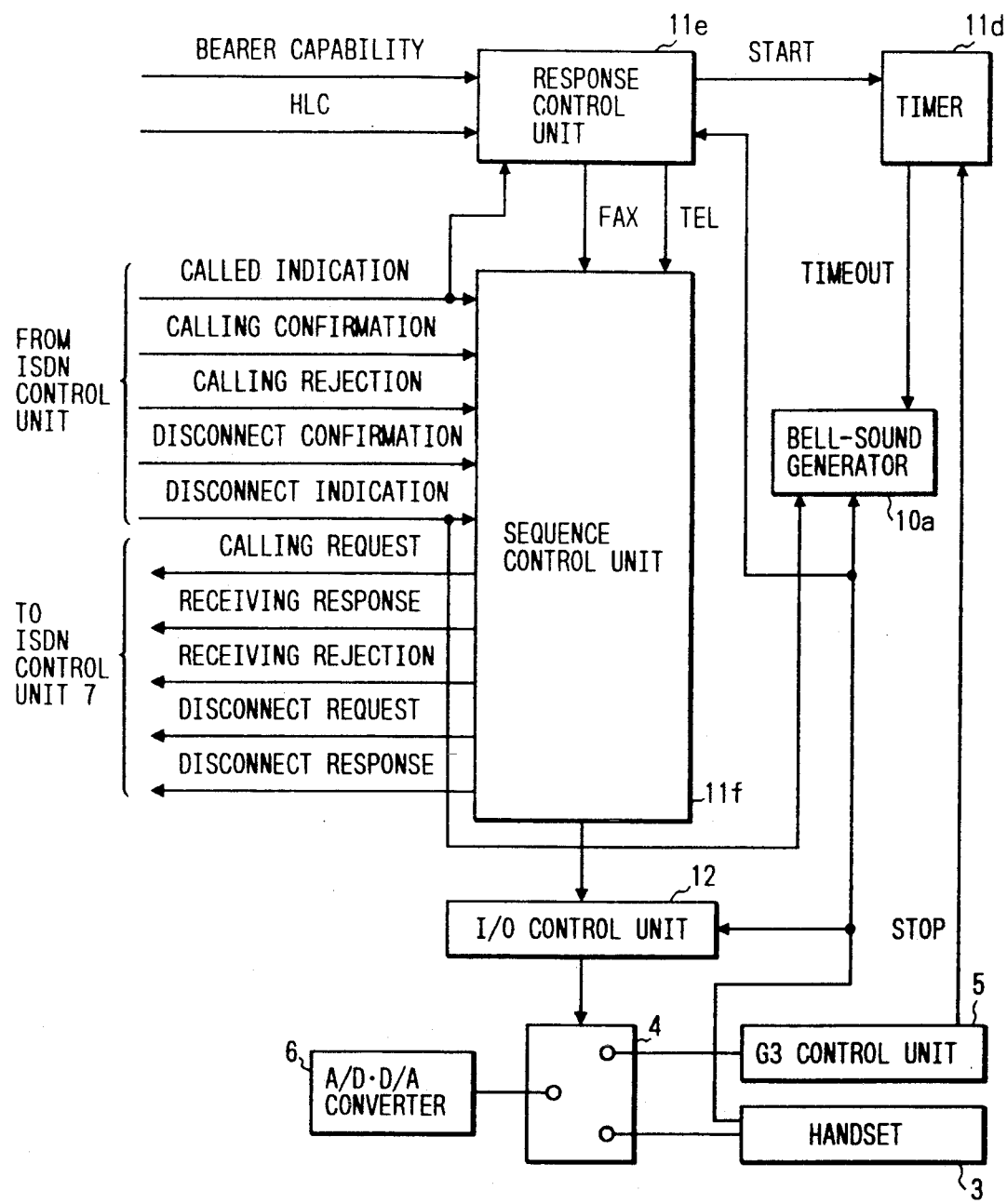
FIG. 6 is a functional block diagram of a second embodiment of the present invention.
Figure 7:
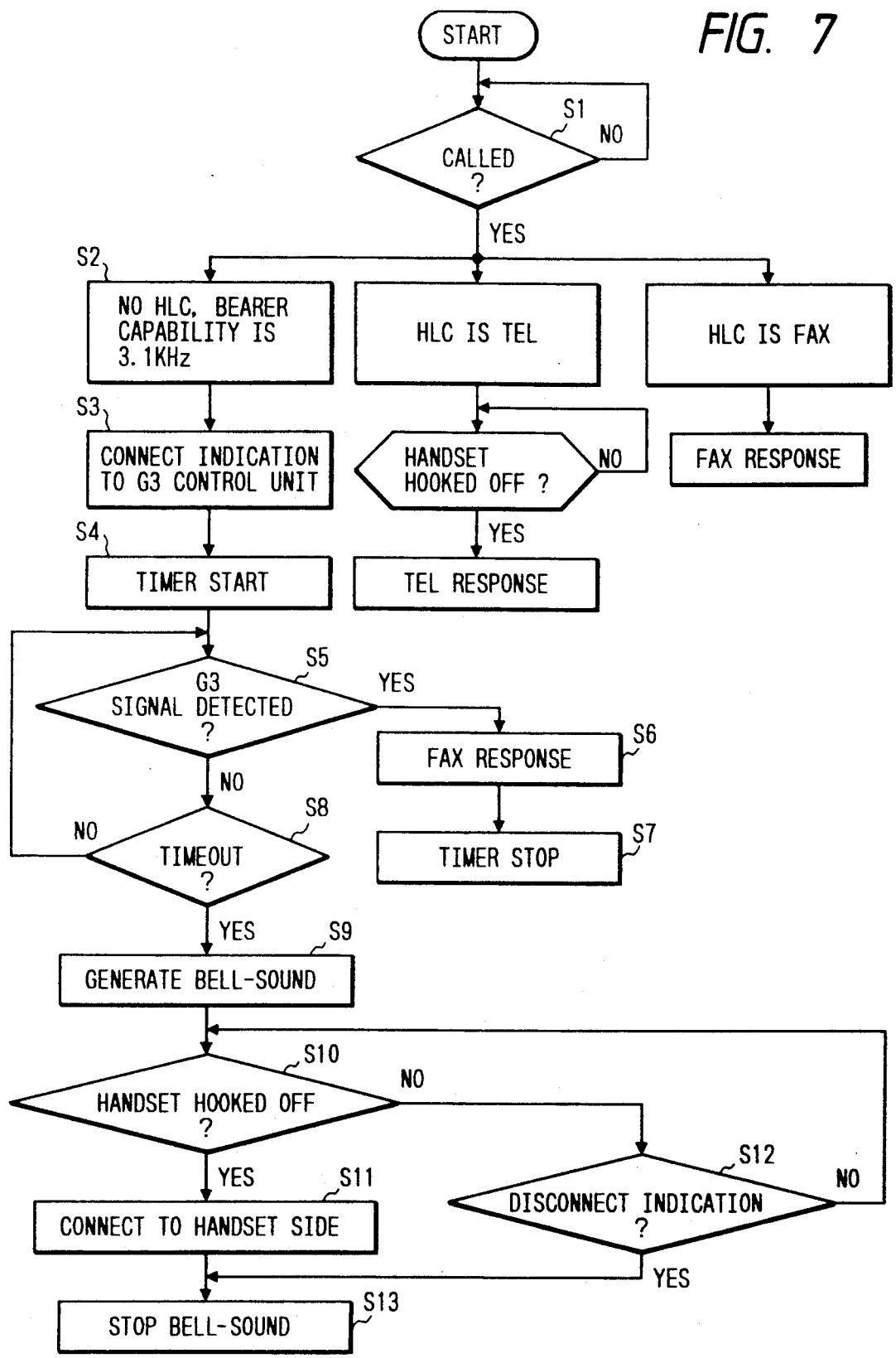
FIG. 7 is a flowchart illustrating the operation of the second embodiment.

Referring now to FIGS. 6 and 7, a description will be given of a second embodiment of the present invention. In FIG. 6, reference numeral 10a denotes a bell-sound generating unit, and the other reference numerals denote identical or equivalent units to those shown in FIG. 1.

This embodiment is characterized in that, in the above-described case (1) where there is no high layer compatibility HLC and the bearer capability is the 3.1 kHz audio signal, the response control unit 11e notifies a FAX response to the sequence control unit 11f, and the timer 11d is started.

Upon receiving the notification from the ISDN control unit 7 at the time of call reception (YES in Step S1 in FIG. 7) that there is no high layer compatibility HLC and the bearer capability is the 3.1 kHz audio signal, the response control unit 11e notifies the FAX response to the sequence control unit 11f, and starts the timer 11d (Steps S3, S4). As a result, the sequence control unit 11f connects the switch 4 to the G3 control unit 5 via the I/O control unit 12.

If the above-described connection is established, the G3 control unit 5 generates a command signal of a protocol, and detects whether or not the distant apparatus has responded to the same (Step S5). If a response is returned by the distant apparatus within a predetermined time set by the timer (YES in Step 5), the operation proceeds to Step S6 to effect response by the facsimile. Subsequently, the operation of the timer 11d is stopped (Step S7).

Meanwhile, in a case where no response is obtained from the distant apparatus with respect to the command signal of the protocol after the lapse of the time set in the timer 11d (YES in Step S8), the operation proceeds to Step S9 to start the bell-sound generating unit 10a.

In Step S10, a determination is made as to whether or not the handset 3 has been hooked off, and if it has been hooked off, the switch 4 is changed over to the handset side by means of the I/O control unit 12 (Step S11). Then, the bell sound is stopped (Step S13).

If the handset 3 has not been hooked off in Step S10, the operation proceeds to Step S12 to determine whether or not a disconnect indication signal has arrived from the ISDN control unit 7, and if it has arrived, the operation proceeds to step S13 to stop the bell sound.

It should be noted that the operation in the case where the notification to the effect that the high layer compatibility HLC is telephone (TEL) as in (2) above or the high layer compatibility HLC is G2/G3 FAX as in (3) above has been received from the ISDN control unit at the time of call reception is similar to that of the above-described first embodiment, so that a description thereof will be omitted.

As is apparent from the above description, in accordance with this embodiment, since, in the case where there is no high layer compatibility HLC, communication is first effected using the protocol of facsimile, in addition to the advantage of the above-described first embodiment there is an advantage in that a determination can be made accurately whether or not the distant apparatus is a facsimile apparatus, and that the number of erroneous operations can be reduced.

As described above, in accordance with the invention, in the case where the high layer compatibility HLC is G2/G3 FAX, the A/D-D/A converter and the FAX are immediately connected to each other without operating the timer. Hence, there is an advantage in that the waste of time and wasteful bell sound as in the case of a conventional apparatus can be eliminated.

In addition, in the case where there is no high layer compatibility HLC, the facsimile apparatus is preferentially connected to the distant apparatus, communication is first commenced using the protocol of facsimile. Hence, there is an advantage in that a determination can be made accurately whether or not the distant apparatus is a facsimile apparatus, and that the number of erroneous operations can be reduced.

What is claimed is:

1. A facsimile apparatus which has an automatic facsimile/telephone switching function, comprising:
   a facsimile functional unit including a scanner for reading document information, a codec for coding image information read by said scanner and for decoding coded image information, a facsimile control unit for controlling communication with a distant apparatus, and a printer for printing received image information onto paper;
   a handset for use as a telephone;
   switching means for switching over between said facsimile functional unit and said handset;
   detecting means for detecting a high layer compatibility included in a setup message of an intergrated services digital network (ISDN); and
   system controlling means for controlling overall operation of said facsimile apparatus and said switching means, said system controlling means including a timer for setting a timeout period, said system controlling means 1) connecting said facsimile functional unit to said distant apparatus when the high layer compatibility detected by said detecting means is a facsimile apparatus, 2) connecting said handset to said distant apparatus when the high layer compatibility detected by said detecting means is a telephone, and 3), when no high layer compatibility is detected by said detecting means, connecting one of said facsimile functional unit and said handset to said distant apparatus during said timeout period of said timer, and, unless said system controlling means determines that said distant apparatus corresponds to said one of said facsimile functional unit and said handset, then connecting the other of said facsimile functional unit and said handset to said distant apparatus upon expiration of said timeout period.

2. A facsimile apparatus as claimed in claim 1, wherein said one of said facsimile functional unit and said handset is said handset, said system controlling means connecting said facsimile functional unit to said distant apparatus.

3. A facsimile apparatus which has an automatic facsimile/telephone switching function, comprising:
   a facsimile functional unit including a scanner for reading document information, a codec for coding image information read by said scanner and for decoding coded image information, a facsimile control unit for controlling communication with a distant apparatus, and a printer for printing received image information onto paper;
   a handset for use as a telephone;
   switching means for switching over between said facsimile functional unit and said handset;
   detecting means for detecting a high layer compatibility included in a setup message of an integrated services digital network (ISDN); and
   system controlling means for controlling overall operation of said facsimile apparatus and said switching means, said system controlling means including a timer for setting a timeout period, said system controlling means 1) connecting said facsimile function unit to said distant apparatus when the high layer compatibility detected by said detecting means is a facsimile apparatus, 2) connecting said handset to said distant apparatus when the high layer compatibility detected by said detecting means is a telephone, and 3) when no high layer compatibility is detected by said detecting means, initially connecting said facsimile functional unit to said distant apparatus during said timeout period of said timer while said facsimile functional unit awaits a response from said distance apparatus to a protocol signal transmitted by said facsimile control unit, and connecting said handset to said distant apparatus when no protocol signal response is received from said distant apparatus upon expiration of said timeout period.

* * * * *

UNITED STATES PATENT AND TRADEMARK OFFICE
CERTIFICATE OF CORRECTION

PATENT NO. : 5,260,991
DATED : November 09, 1993
INVENTOR(S) : Tadahiko Ikegaya

It is certified that error appears in the above-indentified patent and that said Letters Patent is hereby corrected as shown below:

Claim 2, column 6, line 16, after "apparatus" insert --unless said handset is off hooked during said timeout period--.

Signed and Sealed this

Sixth Day of September, 1994

Attest:

BRUCE LEHMAN

Attesting Officer     Commissioner of Patents and Trademarks